United States Patent
Yamada (10) Patent No.: US 9,571,299 B2
(45) Date of Patent: Feb. 14, 2017

(54) METHOD FOR MANAGING TREE STRUCTURE, INFORMATION PROCESSING SYSTEM, AND MEDIUM

(71) Applicant: MURAKUMO CORPORATION, Tokyo (JP)

(72) Inventor: Hiroyuki Yamada, Tokyo (JP)

(73) Assignee: MURAKUMO CORPORATION, Tokyo (JP)

(\*) Notice: Subject to any disclaimer, the term of this patent is extended or adjusted under 35 U.S.C. 154(b) by 234 days.

(21) Appl. No.: 14/592,424

(22) Filed: Jan. 8, 2015

(65) Prior Publication Data
US 2015/0124656 A1 May 7, 2015

Related U.S. Application Data (63) Continuation of application No. PCT/JP2012/067473, filed on Jul. 9, 2012.

(51) Int. Cl.
*H04L 12/44* (2006.01)
*G06F 17/30* (2006.01)
(Continued)

(52) U.S. Cl.
CPC ......... *H04L 12/44* (2013.01); *G06F 17/30575* (2013.01); *H04L 41/0816* (2013.01);
(Continued)

(58) Field of Classification Search
CPC .................... G06F 17/30289; G06F 17/30575; H04L 12/44
See application file for complete search history.

(56) References Cited

U.S. PATENT DOCUMENTS

| | | |
|---|---|---|
| 6,023,461 A | 2/2000 | Raychaudhuri et al. |
| 2002/0067706 A1 | 6/2002 | Bautz et al. |

(Continued)

FOREIGN PATENT DOCUMENTS

| | | |
|---|---|---|
| JP | 2001-28594 A | 1/2001 |
| JP | 2007-531155 A | 11/2007 |

(Continued)

OTHER PUBLICATIONS

Extended (Supplementary) European Search Report dated Feb. 25, 2016, issued in counterpart European Patent Application No. 12881107.2. (9 pages).
(Continued)

*Primary Examiner* — Huy D Vu
*Assistant Examiner* — Teisha D Hall
(74) *Attorney, Agent, or Firm* — Westerman, Hattori, Daniels & Adrian, LLP (57) ABSTRACT

In the tree structure, a migrating node forms a connection with a parent node of a migration destination, the migrating node transmits a migration request to a root node, and the root node distributes a reply to the migration request according to the tree structure, upon receiving the reply, the parent node of the migration destination transmits a message, which is received later than the reply, to the migrating node via the formed connection, the migrating node stores in a queue messages which are received later than the reply received via the formed connection, upon receiving a reply distributed according to the tree structure, the migrating node reconstructs the distributed message, based on a message which is received earlier than the reply received from the parent node before migration and a message which is received later than the reply stored in the queue.

11 Claims, 6 Drawing Sheets

(51) Int. Cl.
*H04L 12/24* (2006.01)
*H04L 12/751* (2013.01)
*H04L 12/861* (2013.01)
*H04L 12/753* (2013.01)

(52) U.S. Cl.
CPC .......... *H04L 41/0883* (2013.01); *H04L 45/02* (2013.01); *H04L 45/48* (2013.01); *H04L 49/90* (2013.01)

(56) References Cited

U.S. PATENT DOCUMENTS

| | | | |
|---|---|---|---|
| 2005/0223043 A1 | 10/2005 | Randal et al. | |
| 2005/0283525 A1* | 12/2005 | O'Neal | H04L 12/1854 709/223 |
| 2010/0077104 A1* | 3/2010 | O'Neal | H04L 45/02 709/252 |
| 2012/0011098 A1 | 1/2012 | Yamada | |
| 2012/0254138 A1 | 10/2012 | Yamada | |
| 2013/0179397 A1 | 7/2013 | Yamada | |
| 2013/0179416 A1 | 7/2013 | Yamada | |
| 2013/0179417 A1 | 7/2013 | Yamada | |
| 2013/0185255 A1 | 7/2013 | Yamada | |
| 2013/0204855 A1 | 8/2013 | Yamada | |

FOREIGN PATENT DOCUMENTS

| | | |
|---|---|---|
| JP | 4951137 B2 | 6/2012 |
| WO | 2010/106991 A1 | 9/2010 |

OTHER PUBLICATIONS

M. Nishio, et al., "Lossless handover method for video transmission in mobile ATM networks and its subjective quality assessment", IEEE Communications Magazine, IEEE Service Center, Piscataway, US, vol. 37, No. 11, Nov. 1999, pp. 38-44.

H. Mitts, et al., "Lossless handover for Wireless ATM", Mobile Networks and Applications, J.C. Baltzer AG, Science Publishers, New York, US, vol. 1, No. 3, Dec. 1996, p. 299-312.

Kristian Rauhala, Editor, "Baseline Text for Wireless ATM specifications; ATM Forum BTD-WATM-01.06", Wireless ATM Working Group, Piscataway, NJ, USA, vol. 802.11, Feb. 1998, pp. 1-99.

Notification of Transmittal of Translation of International Preliminary Report on Patentability (Chapter I or Chapter II) Form PCT/IB/338 of the International Application No. PCT/JP2012/067473 mailed on Jan. 22, 2015, with forms PCT/IB/373 and PCT/ISA/237. (6 pages).

Extended (Supplementary) European Search Report dated Jun. 6, 2016, issued in counterpart European Patent Application No. 12881107.2. (19 pages).

International Search Report dated Aug. 21, 2012, issued in corresponding application No. PCT/JP2012/067473.

Extended (Supplementary) European Search Report dated Jun. 6, 2016, issued in counterpart European Patent Application No. 1288107.2. (19 pages).

\* cited by examiner

METHOD FOR MANAGING TREE STRUCTURE, INFORMATION PROCESSING SYSTEM, AND MEDIUM

CROSS-REFERENCE TO RELATED APPLICATION

This application is a continuation application of International Application PCT/JP2012/067473 filed on Jul. 9, 2012 and designated the U.S., the entire contents of which are incorporated herein by reference.

FIELD

The present invention relates to a method for managing a tree structure, an information processing system, and a program.

BACKGROUND

In an information processing system which includes a plurality of information processing devices, the plurality of information processing devices may be connected to a tree structure as nodes. For example, a database system in which a plurality of master nodes are hierarchically connected by a network is known (Japanese Patent No. 4951137).

SUMMARY

In a system including a plurality of information processing devices connected to a tree structure, when a message related to processing of each node is broadcast to the entire system, the message is transmitted from a root node to respective nodes in use of a connection between respective nodes in the tree structure. For example, in Japanese Patent No. 4951137, a situation in which a message related to replication is transmitted to respective nodes in use of a connection between respective nodes in a tree structure is illustrated. Upon receiving the message, the respective nodes execute processing related to the received message.

In the system having this tree structure, when a node other than a leaf node is suspended, the tree structure is broken, and the message is not transmitted to a node connected the suspended node at a lower hierarchical level. Thus, it is necessary to cause the node connected the suspended node at a lower hierarchical level to migrate so as to maintain the tree structure of the system.

When a tree structure is maintained, the migrating node disconnects the current connection during the migration and forms a new connection (reconnection). In this case, the migrating node cannot receive messages transmitted in a phase between the disconnection and the reconnection.

As a method for solving this problem, there is provided, as mentioned above, a method of allowing all nodes to store all messages transmitted and to resend the messages transmitted in a phase between the disconnection of the migrating node and the reconnection to the migrating node. However, for example, in the situation where messages related to replication are transmitted, as illustrated in Japanese Patent No. 4951137, a large volume of messages may be transmitted. In such a case, the method of allowing all nodes to store the transmitted messages is not practical from the perspective of resource efficiency.

Thus, as another method, a method of allowing the migrating node to form a reconnection in a state where it is not possible to acquire messages transmitted between the disconnection and the reconnection is known. In this method, the migrating node needs to make up for the lack of messages, and in some cases, an initialization process for making up for the lost messages is performed. However, depending on the lost message, the initialization process may fail and system consistency may be lost, and the process of reconnecting the migrating node may be abandoned. That is, in this method, node migration exhibits a gambling property, and it is difficult to migrate nodes freely.

Thus, in the conventional methods, in a system in which a large volume of messages are transmitted within a tree structure, it is difficult to migrate nodes reliably without impairing the system consistency.

The present invention has been made in view of the above, and an object of the present invention is to provide a technique of enabling nodes to migrate reliably without impairing the system consistency in a system in which a large volume of messages are transmitted within a tree structure.

A first aspect of the present invention is a method for managing a tree structure associated with migration of positions of nodes on a tree structure in an information processing system in which a plurality of information processing devices are connected in a tree structure as nodes and a message is distributed according to the tree structure, the method including: causing a migrating node to form a connection with a parent node of a migration destination, which serves as a parent node of the migrating node after the migration; causing the migrating node to transmit a migration request to a root node in the tree structure; causing the root node to distribute a reply to the migration request according to the tree structure; causing the parent node of the migration destination, upon receiving the reply, to transmit a message, which is received later than the reply, to the migrating node via the formed connection; causing the migrating node to store in a queue the message received from the parent node of the migration destination via the formed connection; causing the migrating node, upon receiving the reply distributed according to the tree structure, to reconstruct the distributed message, based on a message which is received earlier than the reply received from the parent node before migration of the migrating node and the message which is received later than the reply stored in the queue; and causing the migrating node or the parent node before migration to disconnect the connection between the migrating node and the parent node before migration.

According to the first aspect of the present invention, first, a connection is formed between a migrating node and a parent node of a migration destination in the tree structure. Subsequently, a migration request is transmitted from the migrating node to a root node, and a reply to the migration request is distributed from the root node according to the tree structure. When the parent node of the migration destination receives the reply, a message which is received later than the reply is transmitted to the migrating node via the formed connection. The migrating node stores messages which are received later than the reply received via the formed connection in a queue. When the migrating node receives the reply distributed according to the tree structure, the migrating node reconstructs a distributed message based on a message which is received earlier than the reply received from the parent node before migration and a message which is received later than the reply stored in the queue. Moreover, the connection between the migrating node and the parent node before migration is disconnected, and migration of the migrating node is completed.

According to the first aspect of the present invention, since the distributed messages are reconstructed reliably using the messages stored in the queue of the migrating node, it is possible to migrate nodes reliably without causing a gambling property in migration of nodes. Moreover, since the amount of messages stored for reconstruction of messages corresponds to only the amount of messages stored in the queue of the migrating node, it is possible to save resources remarkably as compared to a method of storing the transmitted messages in all nodes. Thus, according to the first aspect of the present invention, it is possible to migrate nodes reliably without impairing the system consistency in a system in which a large volume of messages are transmitted within the tree structure.

A second aspect of the present invention is the method for managing a tree structure according to the first aspect, in which after reconstructing the distributed message, the migrating node processes messages received from the parent node of the migration destination without storing the same in the queue.

A third aspect of the present invention is the method for managing a tree structure according to the first or second aspect, in which the parent node before migration does not transmit a message which is received later than the reply to the migrating node by stopping distribution of messages to the migrating node after receiving the reply distributed according to the tree structure.

A fourth aspect of the present invention is the method for managing a tree structure according to any one of the first to third aspects, in which the reply to the migration request includes information indicating the migrating node and information indicating the migration destination of the migrating node and is distributed to all nodes included in the information processing system according to the tree structure.

A fifth aspect of the present invention is the method for managing a tree structure according to any one of the first to third aspects, in which the reply to the migration request is distributed to nodes included in a path from the root node to the migrating node.

A sixth aspect of the present invention is a method for managing a tree structure associated with replacement of nodes in an information processing system in which a plurality of information processing devices are connected in a tree structure as nodes and a message is distributed according to the tree structure, the method including: in order to replace a replacement target node with a substitution node in use of a leaf node of the tree structure as the substitution node replaced with the replacement target node, migrating the substitution node so that a parent node of a migration destination of the substitution node becomes a parent node of the replacement target node by a node migration process associated with positions in the tree structure; and when the replacement target node includes a child node, migrating the child node so that a parent node of a migration destination of the child node becomes the substitution node by the node migration process, the node migration process including: causing a migrating node to form a connection with a parent node of a migration destination, which serves as a parent node of the migrating node after the migration; causing the migrating node to transmit a migration request to a root node of the tree structure; causing the root node to distribute a reply to the migration request according to the tree structure; causing the parent node of the migration destination, upon receiving the reply, to transmit a message which is received later than the reply to the migrating node via the formed connection; causing the migrating node to store in a queue the message received from the parent node of the migration destination via the formed connection; causing the migrating node, upon receiving the reply distributed according to the tree structure, to reconstruct the distributed message, based on a message which is received earlier than the reply received from the parent node before migration of the migrating node and the message which is received later than the reply stored in the queue; and causing the migrating node or the parent node before migration to disconnect the connection between the migrating node and the parent node before migration.

A seventh aspect of the present invention is the method for managing a tree structure according to the sixth aspect, in which the method further includes: causing the replacement target node to transmit a replacement request to the root node of the tree structure; and causing the root node to distribute a reply to the replacement request according to the tree structure, wherein the substitution node starts migration of nodes based on the node migration process by receiving a reply to the replacement request distributed from the root node, and when the replacement target node includes a child node, the child node starts migration of nodes based on the node migration process by receiving a reply to the migration request distributed during migration of the substitution node.

As another aspect of the method of managing a tree structure according to the respective aspects, an information processing system or a program that realizes the respective configurations may be provided, and a recording medium that stores such a program and that can be read by a computer or other devices, machines, or the like may be provided. Here, the recording medium readable by a computer or the like is a medium that stores information such as a program by electrical, magnetical, optical, mechanical, or chemical action. A database system may be realized by one or a plurality of computers.

For example, an eighth aspect of the present invention is an information processing system in which a plurality of information processing devices are connected in a tree structure as nodes and a message is distributed according to the tree structure, the system including: means for causing a migrating node to form a connection with a parent node of a migration destination, which serves as a parent node of the migrating node after the migration; means for causing the migrating node to transmit a migration request to a root node of the tree structure; means for causing the root node to distribute a reply to the migration request according to the tree structure; means for causing the parent node of the migration destination, upon receiving the reply, to transmit a message which is received later than the reply to the migrating node via the formed connection; means for causing the migrating node to store in a queue the message received from the parent node of the migration destination via the formed connection; means for allowing the migrating node, upon receiving the reply distributed according to the tree structure, to reconstruct the distributed message, based on a message which is received earlier than the reply received from the parent node before migration of the migrating node and the message which is received later than the reply stored in the queue; and means for causing the migrating node or the parent node before migration to disconnect the connection between the migrating node and the parent node before migration.

Moreover, for example, a ninth aspect of the present invention is an information processing system in which a plurality of information processing devices are connected in a tree structure as nodes and a message is distributed according to the tree structure, the system including: means for, in order to replace a replacement target node with a substitution node in use of a leaf node of the tree structure as the substitution node replaced with the replacement target node, migrating the substitution node so that a parent node of a migration destination of the substitution node becomes a parent node of the replacement target node by a node migration process associated with positions in the tree structure; and means for, when the replacement target node includes a child node, migrating the child node so that a parent node of a migration destination of the child node becomes the substitution node by the node migration process, the node migration process including: causing a migrating node to form a connection with a parent node of a migration destination, which serves as a parent node of the migrating node after the migration; causing the migrating node to transmit a migration request to a root node of the tree structure; causing the root node to distribute a reply to the migration request according to the tree structure; causing the parent node of the migration destination, upon receiving the reply, to transmit a message which is received later than the reply to the migrating node via the formed connection; causing the migrating node to store in a queue the message received from the parent node of the migration destination via the formed connection; causing the migrating node, upon receiving the reply distributed according to the tree structure, to reconstruct the distributed message, based on a message which is received earlier than the reply received from the parent node before migration of the migrating node and the message which is received later than the reply stored in the queue; and causing the migrating node or the parent node before migration to disconnect the connection between the migrating node and the parent node before migration.

Further, for example, a tenth aspect of the present invention is a program for causing an information processing system in which a plurality of information processing devices are connected in a tree structure as nodes and a message is distributed according to the tree structure to execute: causing a migrating node to form a connection with a parent node of a migration destination, which serves as a parent node of the migrating node after the migration; causing the migrating node to transmit a migration request to a root node of the tree structure; causing the root node to distribute a reply to the migration request according to the tree structure; causing the parent node of the migration destination, upon receiving the reply, to transmit a message which is received later than the reply to the migrating node via the formed connection; causing the migrating node to store in a queue the message received from the parent node of the migration destination via the formed connection; causing the migrating node, upon receiving the reply distributed according to the tree structure, to reconstruct the distributed message, based on a message which is received earlier than the reply received from the parent node before migration of the migrating node and the message which is received later than the reply stored in the queue; and causing the migrating node or the parent node before migration to disconnect the connection between the migrating node and the parent node before migration.

Further, for example, an eleventh aspect of the present invention is a program for causing an information processing system in which a plurality of information processing devices are connected in a tree structure as nodes and a message is distributed according to the tree structure to execute: in order to replace a replacement target node with a substitution node in use of a leaf node of the tree structure as the substitution node replaced with the replacement target node, migrating the substitution node so that a parent node of a migration destination of the substitution node becomes a parent node of the replacement target node by a node migration process associated with positions in the tree structure; and when the replacement target node includes a child node, migrating the child node so that a parent node of a migration destination of the child node becomes the substitution node by the node migration process, the node migration process including: causing a migrating node to form a connection with a parent node of a migration destination, which serves as a parent node of the migrating node after the migration; causing the migrating node to transmit a migration request to a root node of the tree structure; causing the root node to distribute a reply to the migration request according to the tree structure; causing the parent node of the migration destination, upon receiving the reply, to transmit a message which is received later than the reply to the migrating node via the formed connection; causing the migrating node to store in a queue the message received from the parent node of the migration destination via the formed connection; causing the migrating node, upon receiving the reply distributed according to the tree structure, to reconstruct the distributed message, based on a message which is received earlier than the reply received from the parent node before migration of the migrating node and the message which is received later than the reply stored in the queue; and causing the migrating node or the parent node before migration to disconnect the connection between the migrating node and the parent node before migration.

According to the present invention, it is possible to enable nodes to migrate reliably without impairing the system consistency in a system in which a large volume of messages are transmitted within a tree structure.

DESCRIPTION OF EMBODIMENTS

Hereinafter, an embodiment (hereinafter also referred to as a "present embodiment") according to an aspect of the present invention will be described based on the drawings. The present embodiment described below is an example of the present invention in all respects and does not intend to limit the scope thereof. Naturally, various improvements and modifications can be made without departing from the scope of the present invention. That is, when the present invention is implemented, specific configurations corresponding to respective embodiments may be employed appropriately.

Although data appearing in the present embodiment is described by natural language, more specifically, the data is designated by quasi-language, commands, parameters, machine language, or the like that a computer can recognize.

CONFIGURATION EXAMPLE

Figure 1:
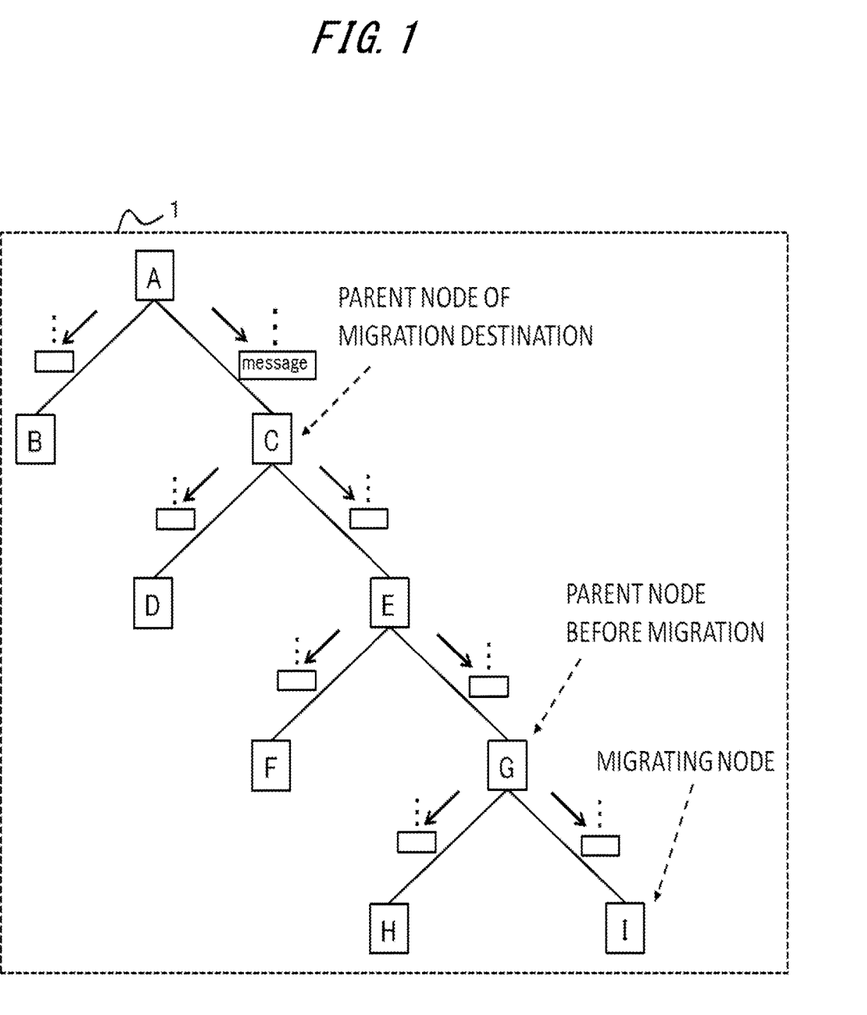
FIG. 1 illustrates an information processing system according to an embodiment, in which a plurality of information processing devices are connected in a tree structure as nodes.

FIG. 1 illustrates an information processing system 1 according to the present embodiment, in which a plurality of information processing devices are connected in a tree structure as nodes. In the following description, the plurality of information processing devices are also referred to as nodes.

Branches between respective nodes represent connections. On the connection, an arrival order of messages is guaranteed. That is, each node can rearrange received messages in a correct order (for example, in the transmission order) even when the order of messages is changed on a network. An example of such a connection is a transmission control protocol (TCP) connection.

In the present embodiment, respective nodes may be connected in a mesh form or may be connected in parallel so that the nodes can communicate with any node on a network, for example. In such a network, each node recognizes at least its parent and child nodes in a tree structure from among a plurality of nodes, among which communication can be carried out. In this way, communication is realized in such a tree structure as illustrated in FIG. 1.

The connection used for communication between nodes is not limited to the connection of a tree structure, and each node may communicate with a node that is not associated with the tree structure. That is, a connection that is not associated with the tree structure may be used for communication between nodes.

Moreover, each node may not necessarily be in a state where the node can communicate with all nodes other than the subject node, included in the information processing system 1. For example, a node which is not associated with migration may not be in a state where the node can communicate with a node which is associated with migration. In the example illustrated in FIG. 1, a node B may not be in a state where the node B can communicate with nodes at a hierarchical level not higher than the node C. Moreover, a node D may not be in a state where the node D can communicate with nodes at a hierarchical level not higher than the node E.

Moreover, each node may recognize the tree structure in addition to its parent and child nodes. For example, each node may recognize which node is a root node of the tree structure. Moreover, for example, each node may recognize the entire tree structure of the information processing system 1. Here, respective nodes may have different degrees of recognizing in the tree structure. For example, some nodes may recognize their parent and child nodes of a tree structure, whereas the other nodes may recognize the entire tree structure.

Each node recognizes the tree structure by a RAM included in a controller or a storage device storing information on the tree structure. For example, each node may store information (neighboring node information) indicating its parent and child nodes on a tree structure as information on the tree structure in order to recognize its parent and child nodes on the tree structure. Moreover, for example, each node may recognize information (root node information) indicating a root node in order to recognize which node is the root node. Further, for example, each node may store information (tree information) indicating the entire tree structure as information on a tree structure in order to recognize the entire tree structure.

As illustrated in FIG. 1, in the information processing system 1 according to the present embodiment, for example, when a message is distributed to all nodes, the message is distributed according to the tree structure from the node A which is a root node of the tree structure. That is, upon receiving the message from its parent node, each node transmits the received message to its child node. Such reception and transmission of messages is repeatedly performed until the message arrives at a leaf node, whereby the message is distributed to all nodes.

When the information processing system 1 is a database system illustrated in Japanese Patent No. 4951137, the distributed message is a transaction log which is distributed from a high-level master node, for example. The content of the distributed message is appropriately selected depending on an embodiment. In the following description, the message distributed according to the tree structure from the root node to all nodes is referred to as a tree message. However, in the information processing system 1, the distributed message is not limited to the tree message, and messages may be distributed following an optional method other than such a method.

As described above, in the connection of the tree structure of the present embodiment, the arrival order of messages is guaranteed. Due to this, such a tree message can be processed in the same order in all nodes. In the present embodiment, the tree message is processed in the same order in the respective nodes included in the information processing system 1, whereby the system consistency is maintained.

In FIG. 1, a situation in which a node I is a migrating node and the positions of nodes on the tree structure are moved so that a node C is a parent node of a migration destination is illustrated. The migrating node is not limited to the node I but may be an optional node within the tree structure.

Here, as illustrated in FIG. 1, the parent node before migration of the node I is a node G. That is, it can be recognized that the migration of the node I is a migration for changing the parent node from the node G to the node C.

Figure 2:
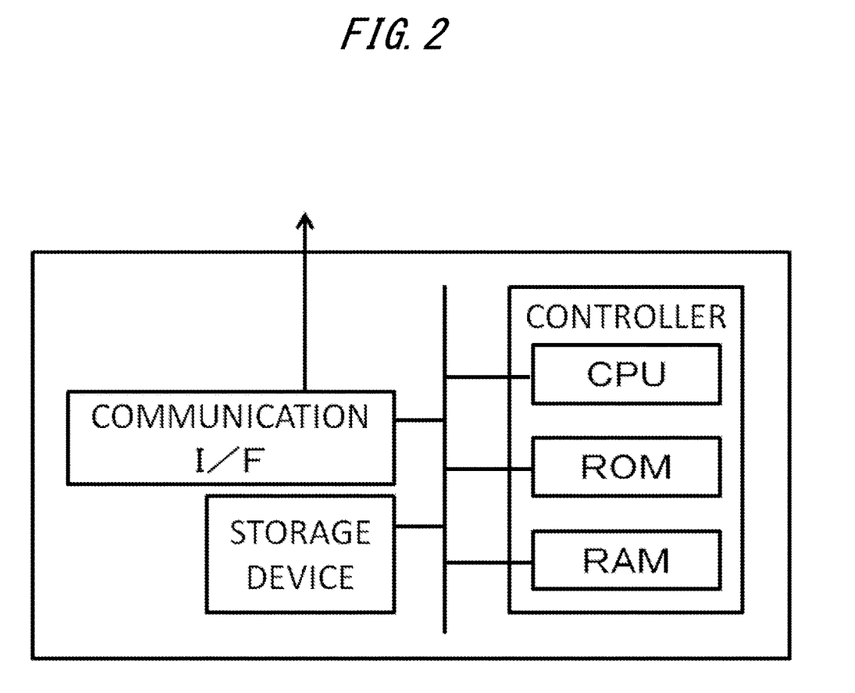
FIG. 2 illustrates a node (information processing device) according to an embodiment.

FIG. 2 illustrates a hardware configuration of each node included in the information processing system 1. As illustrated in FIG. 2, each node is an information processing device in which a controller including a central processing unit (CPU), a random access memory (RAM), a read only memory (ROM), and the like, a storage device storing programs or the like executed by the controller, and a communication interface for performing communication via a network are electrically connected. In FIG. 2, the communication interface is described as a "communication I/F". The RAM and the ROM included in the controller are referred to as a main storage device, and the storage device may be referred to as an auxiliary storage device. The CPU included in the controller may be also referred to as a processing unit. Each node may be a personal computer (PC), a server machine, or the like.

Constituent components of the hardware configuration of each node may be omitted, replaced, and added appropriately according to an embodiment. For example, the controller may include a plurality of processors.

Moreover, all nodes included in the information processing system 1 may have the same hardware configuration. Moreover, some nodes included in the information processing system 1 may include different constituent components from the other nodes. The constituent components of the respective nodes are selected appropriately according to an embodiment.

OPERATION EXAMPLE

Figure 3:
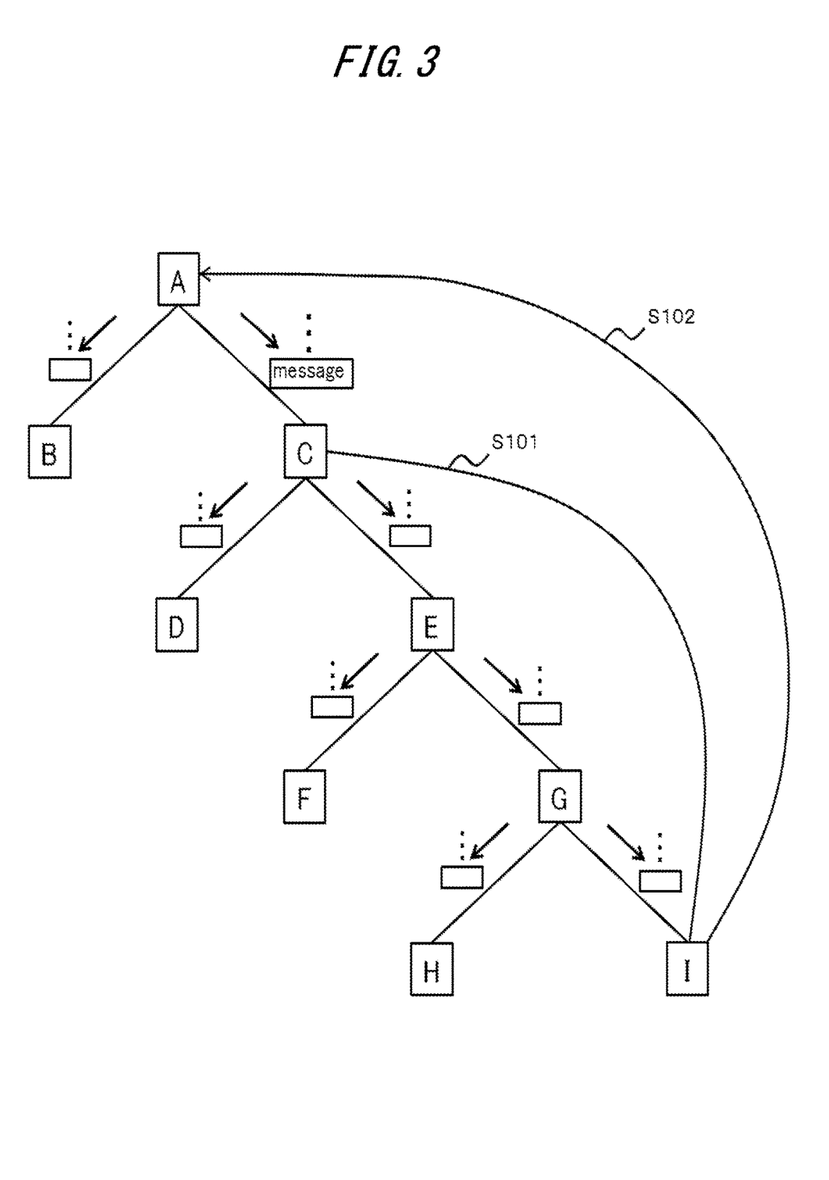
FIG. 3 illustrates a node migration sequence according to an embodiment.
Figure 4:
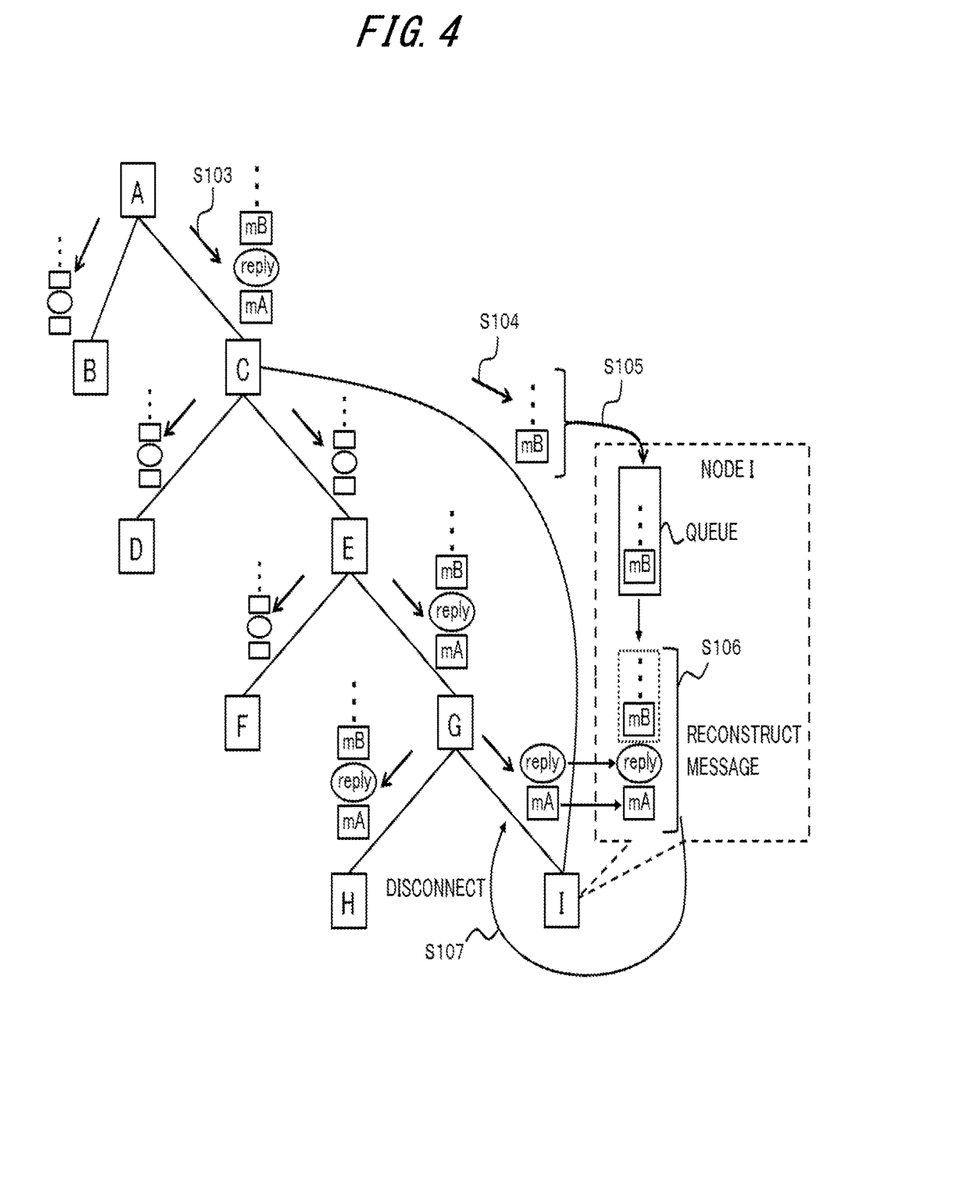
FIG. 4 illustrates a node migration sequence according to an embodiment.

FIGS. 3 and 4 illustrate a node migration sequence according to the present embodiment. In the respective diagrams, steps are denoted by "S". The same notation is used in FIG. 6 described later. Moreover, in FIG. 4, a tree message A is denoted by "mA" and a tree message B is denoted by "mB".

As illustrated in FIG. 3, in step 101, a controller of the node I performs communication for forming a connection with the node C using a communication interface to form a connection with the node C which is a parent node of a migration destination. In the formed connection, the arrival order of messages is guaranteed similarly to the connection on the tree structure described above. An example of the formed connection is a TCP connection. After that, the process flow proceeds to step 102.

In step 102, the controller of the node I transmits a migration request to a node A which is a root node of the tree structure using the communication interface. After that, the process flow proceeds to step 103.

The migration request may be transmitted to the node A by being distributed according to the tree structure and may be transmitted directly to the node A without according to the tree structure. When the migration request is distributed according to the tree structure, the node I transmits the migration request to the node G which is its parent node by referring to information on the tree structure stored in the node I. The controllers of the nodes G, E, and C transmit the received migration request to their parent nodes by referring to the information on the tree structure stored in the nodes G, E, and C. As a result, the migration request is distributed according to the tree structure (in the example of FIG. 1, the migration request is distributed in the order of nodes I, G, E, C, and A) and is transmitted to the node A. In this case, each node needs only to recognize its parent and child nodes (that is, the neighboring nodes) as the information on the tree structure.

On the other hand, the migration request may be transmitted directly to the node A without according to the tree structure. Here, as described above, there is a case where each node stores neighboring node information for recognizing its parent and child nodes as the information on the tree structure. When the node I dose not has information on the tree structure except the neighboring node information, the node I cannot specify which node is the root node. Thus, the controller of the node I may transmit the migration request to the node A by distributing the migration request to all nodes without designating a destination by multicasting or broadcasting, for example. In this case, each node recognize its parent and child nodes at least by the neighboring node information. Thus, each node can at least recognize whether the subject node is a root node by knowing whether the subject node has a parent node. Therefore, nodes other than the root node (the node A) disregard the migration request, whereby only the root node (the node A) can process the migration request. The node A may recognize that the subject node A is the root node of the tree structure.

Moreover, each node may store root node information for recognizing which node is the root node as the information on the tree structure. When the node I stores the root node information, the controller of the node I can specify the root node by referring to the root node information. Due to this, in this case, the controller of the node I may specify that the root node is the node A by referring to the root node information and may transmit the migration request to the node A.

Moreover, each node may has the tree information for recognizing the entire tree structure as the information on the tree structure. When the node I stores the tree information, similarly to the case of the root node information, the controller of the node I can specify the root node by referring to the tree information. Due to this, in this case, similarly to the case of the root node information, the controller of the node I may specify that the root node is the node A by referring to the tree information and may transmit the migration request to the node A.

As illustrated in FIG. 4, in step 103, the controller of the node A distributes a reply to the migration request according to the tree structure using the communication interface. Each node distributes the reply and the tree message using the communication interface. After that, the process flow proceeds to step 104.

Here, in FIG. 4, the tree message A illustrates a tree message before reply. Moreover, the tree message B illustrates a tree message after reply. Further, although not denoted in FIG. 4, an ellipse represents a reply, a rectangle represents a tree message, and nodes B and D to F receive the tree message and the reply in the same order as the nodes C, G, and H.

In step 104, upon receiving the reply, the controller of the node C which is a parent node of a migration destination transmits the tree message B which is received later than the reply to the node I which is the migrating node using the communication interface. In this case, the controller of the node C transmits the tree message B to the node I using the connection formed in step 101. After that, the process flow proceeds to step 105.

The node C recognizes that the received reply is a reply which is associated with the subject node C from the content of the reply.

As an example, the reply may include information indicating the migrating node. In this case, when the migrating node indicated by the information included in the received reply is the node that has formed the connection in step 101, the controller of the node C recognizes that the received reply is a reply which is associated with the subject node C.

Moreover, as another example, the reply may include information indicating a parent node of a migration destination of the migrating node in addition to the information indicating the migrating node. In this case, when the parent node of the migration destination indicated by the information included in the reply is the subject node C, the controller of the node C recognizes that the received reply is a reply which is associated with the subject node C.

In step 105, upon receiving the tree message B transmitted via the connection formed in step 101, the controller of the node I stores the received tree message B in a queue. After that, the process flow proceeds to step 106.

A storage area of the queue may be secured in the RAM included in the controller and may be secured in the storage device. The controller of the node I secures the storage area of the queue in at least one of the RAM and the storage device and stores the tree message B received via the communication interface in the queue. Here, the controller of the node I may secure a storage area having a predetermined size as the storage area of the queue and may increase the storage area of the queue every time the controller stores the tree message B in the queue. A method of securing the storage area of the queue is selected appropriately according to an embodiment.

In step 106, upon receiving the reply distributed according to the tree structure, the controller of the node I reconstructs the tree message distributed from the node A based on the tree message A received earlier than the reply received from the node G which is the parent node before migration and the tree message B stored in the queue. In this way, in the node I, the arrival order of tree messages distributed from the node A is secured. Due to this, in the present embodiment, it is possible to migrate nodes without impairing the system consistency. After that, the process flow proceeds to step 107.

Here, as illustrated in FIG. 4, the node G which is the parent node before migration may not transmit the tree message B which is received later than the reply to the node I by stopping distributing the tree message to the node I after receiving the reply distributed according to the tree structure.

In this case, the node G recognizes the movement of the node I, which is the child node of the subject node G, from the content of the reply, for example. As described as an example of the content of the reply, the reply may include information indicating the migrating node. In this case, when the node indicated by the information indicating the migrating node included in the received reply is the child node of the subject node G, the controller of the node G recognizes that the child node of the subject node G migrates.

In the present operation example, the controller of the node G recognizes that the node I migrates. Moreover, the controller of the node G does not need to transmit the tree message B which is received later than the reply to the node I by stopping distributing the tree message to the node I after the recognition is obtained.

That is, the controller of the node G can recognize at least that the connection with the node I is not a connection associated with a parent and child relation of nodes after the recognition is obtained. Due to this, the controller of the node G may stop distributing the tree message to the node I by stopping regarding the node I as a child node. Further, the controller of the node G may disconnect the connection with the node I after the recognition is obtained.

Moreover, when the node G does not stop distributing the tree message B to the node I, the controller of the node I may disregard the tree message B received not earlier than the reply, transmitted from the node G.

In step 107, the controller of the node I or the controller of the node G disconnects the connection between the node I and the node G. In this way, the migration of the node I is completed.

In the node migration method illustrated in steps 101 to 107, the migrating node needs only to store the tree message B received later than the reply in the queue as compared to the method in which respective nodes store the distributed message. Due to this, according to the node migration method of the present embodiment, it is possible to save resources as compared to the method in which respective nodes store the distributed message. The effect of saving resources increases in an information processing system in which a larger volume of tree messages are distributed. Due to this, the present node migration method is an important technique in the database system in which a large volume of tree messages are distributed as disclosed in Japanese Patent No. 4951137.

Moreover, in the node migration method according to the present embodiment, it is possible to reconstruct the distributed tree messages reliably based on the tree message stored in the queue of the migrating node and the tree message distributed from the parent node before migration. Due to this, according to the node migration method of the present embodiment, it is possible to migrate nodes reliably without casing a gambling property in the node migration. Moreover, as compared to a system in which an initialization process for making up for the lost messages is performed, the information processing system 1 that performs the node migration method has a simple system configuration because the initialization process is not required.

Further, in the node migration method, the reply distributed from the root node triggers the operation of each node. That is, in the node migration method, it is possible to reconstruct the tree structure without the need to distribute information other than the reply.

Figure 5:
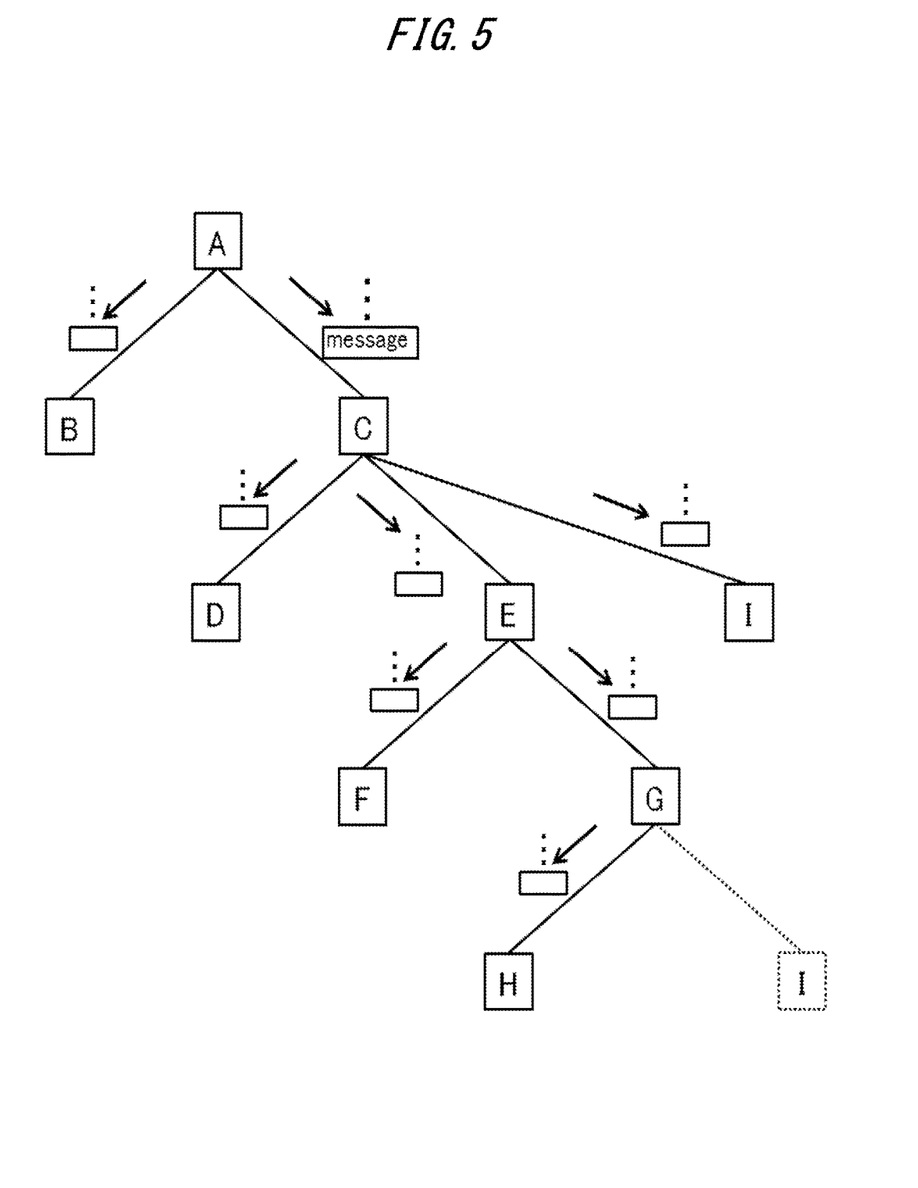
FIG. 5 illustrates a state after a node migrates according to an embodiment.

FIG. 5 illustrates a state after the node I migrates in the information processing system 1 according to the present embodiment. In FIG. 5, a state where the node migration process illustrated in FIGS. 3 and 4 is performed whereby the parent node of the node I is changed from the node G to the node C.

As illustrated in FIG. 5, after the node I migrates, the tree message is distributed according to the conventional method. Moreover, the node I processes the tree message according to the conventional method similarly to the other nodes. Specifically, after reconstructing the tree message in step 106, the controller of the node I processes the tree message received from the node C without storing the same in the queue. That is, the controller of the node I stops the operation of storing the tree message received from the node C in the queue and processes the tree message according to the conventional method.

Here, after reconstruction of the tree message in step 106 ends, the controller of the node I may release the secured storage area of the queue by discarding the queue. Moreover, the controller of the node I may maintain the secured storage area of the queue without discarding the queue and may use the storage area of the queue when a subsequent migration occurs. How the storage area of the queue, which is made unavailable, will be handled is selected appropriately according to an embodiment.

OTHER EXAMPLES

In FIG. 4, an example in which a reply to a migration request is distributed to all nodes included in the information processing system 1 is illustrated. The reply includes information indicating the migrating node.

Here, when a node migration occurs, a parent and child relation of nodes is changed in a migrating node, a parent node of a migration destination, and a parent node before migration. When each nodes stores neighboring node information in order to recognize its parent and child nodes, the migrating node, the parent node of the migration destination, and the parent node before migration update the neighboring node information.

Specifically, in step 104, when the migrating node indicated by the information included in the received reply is a node that has formed the connection in step 101, the parent node of the migration destination recognizes that the received reply is a reply that is associated with the subject node. In this case, the controller of the parent node of the migration destination updates the stored neighboring node information so that the migrating node indicated by the information is added to the child node of the subject node.

Moreover, when the migrating node indicated by the information included in the reply is a child node of the subject node, the controller of the parent node before migration updates the stored neighboring node information so that the migrating node is removed from the child node. Moreover, the controller of the migrating node updates the stored neighboring node information so that the parent node of the subject node becomes the parent node of the migration destination. In this way, each node can continuously recognize at least its parent and child nodes.

Each node may store the tree information in order to recognize the entire tree structure of the information processing system 1. In this case, since the migration request includes information indicating the parent node of the migration destination of the migrating node in addition to the information indicating the migrating node and the reply is distributed to all nodes included in the information processing system 1, each node can continuously recognize the tree structure of the information processing system 1 even after node migration occurrence.

Specifically, the controller of each node recognizes the migrating node and the parent node of the migration destination based on the information included in the received reply. Moreover, the controller of each node updates the stored tree information so as to indicate the state after the node migrates. In the operation example described above, the controller of each node updates the tree information stored in the subject node so that the tree information indicating the tree structure illustrated in FIG. 1 is changed to the tree information indicating the tree structure illustrated in FIG. 5. In this way, each node can continuously recognize the entire tree structure of the information processing system 1.

In FIG. 4, an example in which the reply is distributed to all nodes included in the information processing system 1 is illustrated. However, the reply may not necessarily be distributed to all nodes included in the information processing system 1. For example, the reply may not be distributed to nodes other than the nodes included in the path from the root node to the migrating node. In the example illustrated in FIG. 4, the reply may not be distributed to the nodes B, D, F, and H.

For example, the node A which is the root node of the information processing system 1 stores the tree information for recognizing the entire tree structure of the information processing system 1 in the RAM included in the controller or the storage device. In this case, the node A adds path information indicating a distribution path to a reply to the migration request from the migrating node and distributes the reply. In the operation example described above, the node A adds path information indicating that the reply is distributed in the order of nodes C, E, G, and I to the reply. The nodes C, E, and G determine the destination of the reply by referring to the path information. In this way, the reply can be allowed to be distributed to nodes included in the path from the root node to the migrating node, and the reply can be prevented from being distributed to nodes other than the nodes included in the path from the root node to the migrating node.

Due to this, according to such a reply distribution method, it is possible to suppress the number of distributions of the reply and to save the resources required for distributing the reply.

<Replacement of Nodes>

Figure 6:
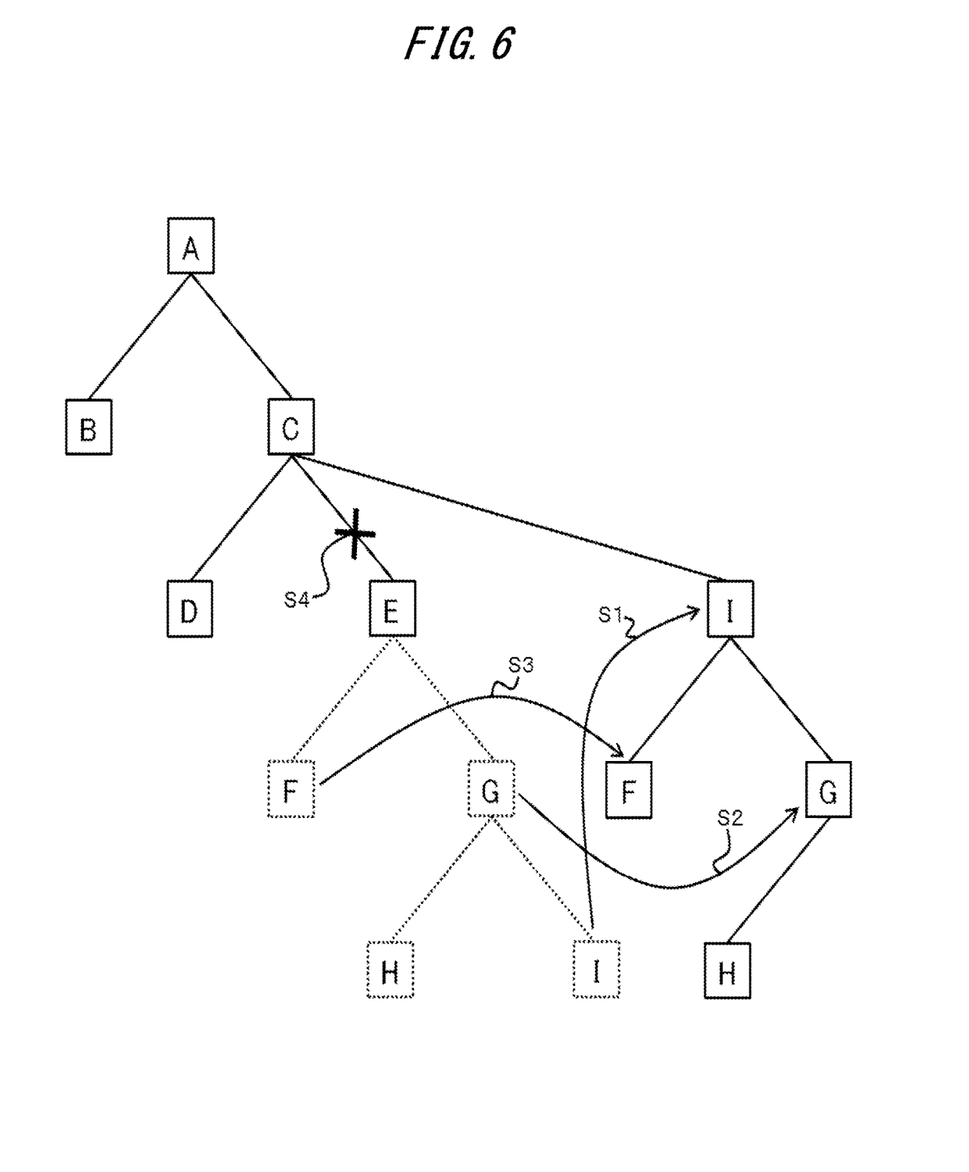
FIG. 6 illustrates a node replacement sequence according to an embodiment.

FIG. 6 illustrates a node replacement sequence according to the present embodiment. It is possible to replace nodes using the node migration method described above. In the example of FIG. 6, a replacement target node is the node E. Moreover, a substitution node replaced with the node E is the node I which is a leaf node. That is, FIG. 6 illustrates the sequence of replacing the node E with the node I in the tree structure illustrated in FIG. 1. In the following description, the description of the node migration method will not be provided, and the node replacement sequence will be described.

In step 1, the node I migrates according to the node migration method so that the parent node of the migration destination of the node I becomes the node C which is the parent node of the node E. Here, the node E includes child nodes (nodes F and G). Thus, the process of steps 2 and 3 are executed as a process of migrating the child nodes. When the node E does not have a child node, the child node migration process is not performed, and the process of step 4 is executed.

In step 2, the node G which is a child node of the node E migrates according to the node migration method so that the parent node of the migration destination of the subject node G becomes the node I. Moreover, in step 3, the node F which is the child node of the node E migrates according to the node migration method so that the parent node of the subject node F becomes the node I. When the processes of steps 2 and 3 end, the process flow proceeds to step 4.

A tree message reconstructed by the node G is distributed to the node H which is the child node of the node G. In this way, the consistency of the tree message is guaranteed in the node H.

Moreover, in the present embodiment, steps 2 and 3 are processed in parallel. Here, steps 2 and 3 may be processed sequentially. For example, the node F may migrate after the node G migrates, and the node G may migrate after the node F migrates. That is, the present embodiment is not limited to the order in which the child nodes of the node E migrate.

In step 4, a connection between the node E and the node C is disconnected. By implementing the processes of steps 1 to 3, in the tree structure, the node I is replaced with the node E, and the nodes F and G, which were the child nodes of the node E, are the child nodes of the node I. Due to this, by the time the processes of steps 1 to 3 are completed, a node, which is affected by the suspension of the node E, is no longer present in the information processing system 1. Thus, the information processing system 1 can remove the node E from the tree structure by disconnecting the connection between the node E and the node C.

With such a sequence, nodes can be replaced. Such a node replacement is performed, for example, when an administrator of the information processing system 1 wants to check nodes and removes a checking target node from the tree structure.

The respective steps described above may start manually and may start automatically. For example, the processes of the respective steps may start when an administrator operates respective nodes using a client PC (not illustrated) for managing the information processing system 1.

Moreover, for example, the reply distributed from the node A may be used as a trigger of the respective steps. The following method will be described as an example thereof.

First, the node E which is a replacement target node transmits a replacement request to the node A which is a root node. For example, the node E transmits a replacement request to the node A according to the same method as that used for the migration request. The replacement request may be referred to as a removal request because the node E is removed from the tree structure in step 4.

Here, when the node E recognizes the entire tree structure, the node E may determine the substitution node. When the node A recognizes the entire tree structure, the node A may determine the substitution node. Moreover, the administrator may designate and determine the substitution node. An optional node included in the system may be selected as the substitution node, and for example, a leaf node which has a little influence on the system even if the leaf node migrates is selected. However, the present embodiment is not limited to the substitution node determining method. A substitution node determining method is selected appropriately according to an embodiment. The following method may be used as a method in which the node E selects the substitution node.

The controller of the node E distributes a retrieval request for retrieving a leaf node included in the system according to the tree structure, for example. The retrieval request may be distributed to nodes at a hierarchical level not higher than the node E and may be distributed from the root node (the node A) as a reply to the request from the node E similarly to the reply to the migration request.

Here, the controller of each node recognizes its parent and child nodes based on at least the neighboring node information. Due to this, the controller of each node can recognize at least whether the subject node is a leaf node by determining whether the subject node has a child node by referring to the information on the tree structure stored therein.

Thus, it is assumed that the controller of each node recognizes whether the subject node is a leaf node. In this case, when a node which is not a leaf node receives the retrieval request, the controller of the node which is not a leaf node distributes the received retrieval request to a child node of the subject node. On the other hand, when a leaf node receives the retrieval request, the controller of the leaf node transmits a reply to the retrieval request to the node E.

The controller of the node E can recognize a leaf node included in the system by receiving a reply to the retrieval request. When the retrieval request is distributed to nodes at a hierarchical level not higher than the node E, the node E can recognize one or a plurality of leaf nodes present at a hierarchical level not higher than the subject node E (in the example of FIG. 6, the nodes F, H, and I). On the other hand, when a retrieval request is distributed from the root node (the node A) as a reply to the request from the node E, the node E can recognize all leaf nodes included in the system (in the example of FIG. 6, the nodes B, D, F, H, and I).

Moreover, the controller of the node E determines a substitution node according to predetermined rules among the leaf nodes that have replied. The predetermined rules for determining the substitution node among the leaf nodes may be optional rules and may be selected appropriately according to an embodiment. According to such a method, the substitution node may be selected by the node E.

Subsequently, upon receiving the replacement request, the root node (the node A) distributes a reply to the replacement request according to the tree structure. In the following description, a reply to the replacement request will be referred to as a replacement reply. Moreover, in the node migration method described above, a reply to the migration request will be referred to as a migration reply. Here, when the replacement request is referred to as a removal request, a replacement reply may be referred to as a removal reply.

Moreover, upon receiving the replacement reply, the substitution node (the node I) starts migration based on the node migration method described above. That is, the substitution node (the node I) starts migration of nodes using the replacement reply as a trigger.

Here, the controller of the root node (the node A) distributes a replacement reply including the information indicating the replacement target node and the information indicating the substitution node. The controller of the substitution node recognizes that the replacement reply is a replacement reply associated with the subject node by referring to these items of information included in the replacement reply and recognizes which node is the replacement target node.

When the controller of the substitution node stores tree information, for example, the controller can specify the parent node of the replacement target node by referring to the tree information and the information included in the replacement reply. In this case, the controller of the substitution node starts such migration of nodes that the parent node of the replacement target node that can be specified based on the information stored therein becomes the parent node of the migration destination according to the above-described node migration method.

On the other hand, the controller may not be able to specify the parent node of the replacement target node using the information stored therein in a case, for example, where the controller of the substitution node stores merely the neighboring node information. In this case, the controller of the substitution node may recognize the parent node of the replacement target node by inquiring the replacement target node, for example.

Moreover, for example, migration destination information indicating the parent node of the replacement target node may be included in the replacement reply. That is, the controller of the root node (the node A) may distribute a replacement reply including the migration destination information according to the tree structure. Moreover, the controller of the substitution node may recognize the parent node of the replacement target node by referring to the migration destination information included in the replacement reply.

As an example of a method of including the migration destination information in the replacement reply, when the root node (the node A) stores the tree information, the controller of the root node (the node A) may specify the parent node of the replacement target node by referring to the tree information. That is, the controller of the root node (the node A) can specify a node indicated by the migration destination information by referring to the tree information. Thus, in this case, the controller of the root node (the node A) can include the migration destination information indicating the parent node of the replacement target node in the replacement reply.

Moreover, another example, the controller of the replacement target node (the node E) may transmit parent node information indicating the parent node of the subject node to the root node (the node E) together with the replacement request. The controller of the root node (node A) having received the parent node information includes the received parent node information in the replacement reply as migration destination information. In this way, it is possible to include the migration destination information indicating the parent node of the replacement target node in the replacement reply.

Moreover, the controller of the substitution node starts such migration of nodes that the parent node of the replacement target node recognized in this manner becomes the parent node of the migration destination. In the example of FIG. 6, the node I starts such migration of nodes that the node C which is the parent node of the node E becomes the parent node of the migration destination (step 1).

Moreover, the child node of the replacement target node (the node E) starts migration by receiving a migration reply distributed during migration of the substitution node (the node I). That is, the child node of the replacement target node (the node E) starts migration using the migration reply distributed during migration of the substitution node (the node I) as a trigger.

In the example of FIG. 6, the replacement target node (the node E) includes a plurality of child nodes (the nodes G and F). In the present embodiment, as described above, when the replacement target node includes a plurality of child nodes, the plurality of child nodes start migration in parallel.

The plurality of child nodes are not in such a relation that the child nodes distribute a tree message to each other. Due to this, even when the respective child nodes start migration in parallel, the arrival order of the tree messages received by the child nodes may not change. Thus, in the present embodiment, when the replacement target node includes a plurality of child nodes, the plurality of child nodes start migration in parallel.

Specifically, first, the controller of the child node of the replacement target node recognizes which node is the substitution node by referring to the information included in the replacement reply and recognizes that the parent node of the subject node is the replacement target node.

Subsequently, the controller of the child node of the replacement target node performs standby until a migration reply distributed during migration of the recognized substitution node is distributed. As described above, the migration reply includes information indicating the migrating node. Due to this, the controller of the child node of the replacement target node can specify whether the received migration reply is a migration reply distributed during migration of the substitution node by referring to the information included in the migration reply.

Moreover, upon receiving the migration reply distributed during migration of the substitution node, the controller of the child node of the replacement target node starts such migration of nodes that the substitution node becomes the parent node of the migration destination. In the example of FIG. 6, the nodes G and F start such migration of nodes in parallel that the node I becomes the parent node of the migration destination (steps 2 and 3).

Lastly, the controller of the replacement target node disconnects the connection with the parent node of the subject node at the time when the connection with the child node of the subject node is disconnected and removes the replacement target node from the tree structure.

Specifically, in the above-described node migration method, in step 107, the connection between the migrating node and the parent node before migration is disconnected. In the above-described operation example, the migrating node or the parent node before migration disconnects the connection. That is, the replacement target node or the child node of the replacement target node disconnects the connection between the replacement target node and the child node of the replacement target node during migration of the child node of the replacement target node.

After the connection with the child node of the subject node is disconnected, the controller of the replacement target node disconnects the connection with the parent node of the subject node and removes the replacement target node from the tree structure. In the example of FIG. 6, after the connection with the nodes G and F is disconnected, the node E disconnects the connection with the node C and removes the subject node from the tree structure (step 4).

As described above, when the replacement target node includes a plurality of child nodes, the plurality of child nodes may perform migration of nodes sequentially. For example, when the replacement target node (the node E) includes a plurality of child nodes, at least one of the plurality of child nodes start migration by receiving the migration reply distributed during migration of the node I. Moreover, a second child node among the plurality of child nodes starts migration by receiving the migration reply distributed during migration of a first child node among the plurality of child nodes. That is, the second child node starts migration based on the above-described node migration method using the migration reply distributed during migration of the first child node as a trigger.

For example, the node F may start migration by receiving a migration reply distributed during migration of the node I (step 2). Moreover, the node G may start migration by receiving a migration reply distributed during migration of the node F (step 3). In this case, the node F corresponds to the first child node and the node G corresponds to the second child node.

Moreover, the node G may start migration by receiving a migration reply distributed during migration of the node I. Moreover, the node F may start migration by receiving a migration reply distributed during migration of the node G. That is, the order of migrations of the nodes G and F may be changed. In this case, the node G corresponds to the first child node and the node F corresponds to the second child node.

When the replacement target node includes a plurality of child nodes, the order of migrations of the plurality of child nodes is determined appropriately according to an embodiment. For example, when a number is allocated to each node, the order of migrations of the plurality of child nodes may be determined based on the number.

In this case, the plurality of child nodes of the replacement target node recognize which node is a child node of the replacement target node including the subject node based on the information on the tree structure stored in the subject node. Moreover, the plurality of child nodes of the replacement target node recognize the number allocated thereto. In this way, the plurality of child nodes of the replacement target node determine the migration order of the subject node based on these items of information every time the child nodes receive the migration reply.

While an embodiment of the present invention has been described in detail, the above description is an example of the present invention in all respects and does not intend to limit the scope thereof. Naturally, various improvements and modifications can be made without departing from the scope of the present invention.

What is claimed is:

1. A method for managing a tree structure associated with migration of positions of nodes on the tree structure in an information processing system in which a plurality of information processing devices are connected in the tree structure as nodes and a message is distributed according to the tree structure, the method comprising:

causing a migrating node to form a connection with a parent node of a migration destination, which serves as a parent node of the migrating node after the migration;

causing the migrating node to transmit a migration request to a root node in the tree structure;

causing the root node to distribute a reply to the migration request according to the tree structure;

causing the parent node of the migration destination, upon receiving the reply, to transmit a message, which is received later than the reply, to the migrating node via the formed connection;

causing the migrating node to store in a queue the message received from the parent node of the migration destination via the formed connection;

causing the migrating node, upon receiving the reply distributed according to the tree structure, to reconstruct the distributed message, based on a message which is received earlier than the reply received from the parent node before migration of the migrating node and the message which is received later than the reply stored in the queue; and causing the migrating node or the parent node before migration to disconnect the connection between the migrating node and the parent node before migration.

2. The method of managing a tree structure according to claim 1, wherein after reconstructing the distributed message, the migrating node processes messages received from the parent node of the migration destination without storing the same in the queue.

3. The method of managing a tree structure according to claim 1, wherein the parent node before migration does not transmit a message which is received later than the reply to the migrating node by stopping distribution of messages to the migrating node after receiving the reply distributed according to the tree structure.

4. The method of managing a tree structure according to claim 1, wherein the reply to the migration request includes information indicating the migrating node and information indicating the migration destination of the migrating node and is distributed to all nodes included in the information processing system according to the tree structure.

5. The method of managing a tree structure according to claim 1, wherein the reply to the migration request is distributed to nodes included in a path from the root node to the migrating node.

6. A method of managing a tree structure associated with replacement of nodes in an information processing system in which a plurality of information processing devices are connected in the tree structure as nodes and a message is distributed according to the tree structure, the method comprising:

in order to replace a replacement target node with a substitution node in use of a leaf node of the tree structure as the substitution node replaced with the replacement target node, migrating the substitution node so that a parent node of a migration destination of the substitution node becomes a parent node of the replacement target node by a node migration process associated with positions in the tree structure; and when the replacement target node includes a child node, migrating the child node so that a parent node of a migration destination of the child node becomes the substitution node by the node migration process, the node migration process comprising:

causing a migrating node to form a connection with a parent node of a migration destination, which serves as a parent node of the migrating node after the migration;

causing the migrating node to transmit a migration request to a root node of the tree structure;

causing the root node to distribute a reply to the migration request according to the tree structure;

causing the parent node of the migration destination, upon receiving the reply, to transmit a message, which is received later than the reply, to the migrating node via the formed connection;

causing the migrating node to store in a queue the message received from the parent node of the migration destination via the formed connection;

causing the migrating node, upon receiving the reply distributed according to the tree structure, to reconstruct the distributed message, based on a message which is received earlier than the reply received from the parent node before migration of the migrating node and the message which is received later than the reply stored in the queue; and causing the migrating node or the parent node before migration to disconnect the connection between the migrating node and the parent node before migration.

7. The method of managing a tree structure according to claim 6, further comprising:

causing the replacement target node to transmit a replacement request to the root node of the tree structure; and causing the root node to distribute a reply to the replacement request according to the tree structure, wherein the substitution node starts migration of nodes based on the node migration process by receiving a reply to the replacement request distributed from the root node, and when the replacement target node includes a child node, the child node starts migration of nodes based on the node migration process by receiving a reply to the migration request distributed during migration of the substitution node.

8. An information processing system in which a plurality of information processing devices are connected in a tree structure as nodes and a message is distributed according to the tree structure, the system comprising:

means for causing a migrating node to form a connection with a parent node of a migration destination, which serves as a parent node of the migrating node after the migration;

means for causing the migrating node to transmit a migration request to a root node of the tree structure;

means for causing the root node to distribute a reply to the migration request according to the tree structure;

means for causing the parent node of the migration destination, upon receiving the reply, to transmit a message, which is received later than the reply, to the migrating node via the formed connection;

means for causing the migrating node to store in a queue the message received from the parent node of the migration destination via the formed connection;

means for allowing the migrating node, upon receiving the reply distributed according to the tree structure, to reconstruct the distributed message, based on a message which is received earlier than the reply received from the parent node before migration of the migrating node and the message which is received later than the reply stored in the queue; and means for causing the migrating node or the parent node before migration to disconnect the connection between the migrating node and the parent node before migration.

9. An information processing system in which a plurality of information processing devices are connected in a tree structure as nodes and a message is distributed according to the tree structure, the system comprising:

means for, in order to replace a replacement target node with a substitution node in use of a leaf node of the tree structure as the substitution node replaced with the replacement target node, migrating the substitution node so that a parent node of a migration destination of the substitution node becomes a parent node of the replacement target node by a node migration process associated with positions in the tree structure; and means for, when the replacement target node includes a child node, migrating the child node so that a parent node of a migration destination of the child node becomes the substitution node by the node migration process, the node migration process comprising:

causing a migrating node to form a connection with a parent node of a migration destination, which serves as a parent node of the migrating node after the migration;

causing the migrating node to transmit a migration request to a root node of the tree structure;

causing the root node to distribute a reply to the migration request according to the tree structure;

causing the parent node of the migration destination, upon receiving the reply, to transmit a message, which is received later than the reply, to the migrating node via the formed connection;

causing the migrating node to store in a queue the message received from the parent node of the migration destination via the formed connection;

causing the migrating node, upon receiving the reply distributed according to the tree structure, to reconstruct the distributed message, based on a message which is received earlier than the reply received from the parent node before migration of the migrating node and the message which is received later than the reply stored in the queue; and causing the migrating node or the parent node before migration to disconnect the connection between the migrating node and the parent node before migration.

10. A computer-readable non-transitory medium having recorded therein a program for causing an information processing system in which a plurality of information processing devices are connected in a tree structure as nodes and a message is distributed according to the tree structure to execute:

causing a migrating node to form a connection with a parent node of a migration destination, which serves as a parent node of the migrating node after the migration;

causing the migrating node to transmit a migration request to a root node of the tree structure;

causing the root node to distribute a reply to the migration request according to the tree structure;

causing the parent node of the migration destination, upon receiving the reply, to transmit a message, which is received later than the reply, to the migrating node via the formed connection;

causing the migrating node to store in a queue the message received from the parent node of the migration destination via the formed connection;

causing the migrating node, upon receiving the reply distributed according to the tree structure, to reconstruct the distributed message, based on a message which is received earlier than the reply received from the parent node before migration of the migrating node and the message which is received later than the reply stored in the queue; and causing the migrating node or the parent node before migration to disconnect the connection between the migrating node and the parent node before migration.

11. A computer-readable non-transitory medium having recorded therein a program for causing an information processing system in which a plurality of information processing devices are connected in a tree structure as nodes and a message is distributed according to the tree structure to execute:

in order to replace a replacement target node with a substitution node in use of a leaf node of the tree structure as the substitution node replaced with the replacement target node, migrating the substitution node so that a parent node of a migration destination of the substitution node becomes a parent node of the replacement target node by a node migration process associated with positions in the tree structure; and when the replacement target node includes a child node, migrating the child node so that a parent node of a migration destination of the child node becomes the substitution node by the node migration process, the node migration process comprising:

causing a migrating node to form a connection with a parent node of a migration destination, which serves as a parent node of the migrating node after the migration;

causing the migrating node to transmit a migration request to a root node of the tree structure;

causing the root node to distribute a reply to the migration request according to the tree structure;

causing the parent node of the migration destination, upon receiving the reply, to transmit a message, which is received later than the reply, to the migrating node via the formed connection;

causing the migrating node to store in a queue the message received from the parent node of the migration destination via the formed connection;

causing the migrating node, upon receiving the reply distributed according to the tree structure, to reconstruct the distributed message, based on a message which is received earlier than the reply received from the parent node before migration of the migrating node and the message which is received later than the reply stored in the queue; and causing the migrating node or the parent node before migration to disconnect the connection between the migrating node and the parent node before migration.

* * * * *